(12) United States Patent
Suvanto

(10) Patent No.: US 9,185,414 B1
(45) Date of Patent: Nov. 10, 2015

(54) VIDEO ENCODING USING VARIANCE

(75) Inventor: Markus Tapio Suvanto, Kempele (FI)

(73) Assignee: GOOGLE INC., Mountain View, CA (US)

( * ) Notice: Subject to any disclaimer, the term of this patent is extended or adjusted under 35 U.S.C. 154(b) by 560 days.

(21) Appl. No.: 13/538,009

(22) Filed: Jun. 29, 2012

(51) Int. Cl.
*H04N 19/10* (2014.01)
*H04N 19/139* (2014.01)
*H04N 19/196* (2014.01)

(52) U.S. Cl.
CPC .............. *H04N 19/10* (2014.11); *H04N 19/139* (2014.11); *H04N 19/196* (2014.11)

(58) Field of Classification Search
CPC ................... H04N 10/00781; H04N 10/00569; H04N 19/00696; H04N 7/50; H04N 7/26244; H04N 7/26031; H04N 7/26271; H04N 7/26015; H04N 19/00; H04N 19/10; H04N 19/20; H04N 19/503; H04N 19/139; H04N 19/196
USPC ...................................................... 375/240.13
See application file for complete search history.

(56) References Cited

U.S. PATENT DOCUMENTS

| | | | |
|---|---|---|---|
| 5,144,426 A | | 9/1992 | Tanaka et al. |
| 5,737,020 A | * | 4/1998 | Hall et al. .................. 375/240.2 |
| 5,838,597 A | * | 11/1998 | Pau et al. ...................... 708/203 |
| 6,032,113 A | * | 2/2000 | Graupe ......................... 704/201 |
| 6,144,322 A | * | 11/2000 | Sato ................................. 341/67 |
| 6,373,895 B2 | * | 4/2002 | Saunders et al. ......... 375/240.19 |
| 6,449,312 B1 | | 9/2002 | Zhang et al. |
| 7,466,774 B2 | | 12/2008 | Boyce |
| 7,529,302 B2 | * | 5/2009 | Mukerjee et al. ........ 375/240.15 |
| 7,580,456 B2 | | 8/2009 | Li et al. |
| 7,606,310 B1 | | 10/2009 | Ameres et al. |
| 7,733,380 B1 | | 6/2010 | Cote et al. |
| 7,809,059 B2 | | 10/2010 | Yin et al. |
| 8,005,144 B2 | | 8/2011 | Ji et al. |
| 8,085,845 B2 | | 12/2011 | Tourapis et al. |
| 8,135,064 B2 | | 3/2012 | Tasaka et al. |

(Continued)

FOREIGN PATENT DOCUMENTS

| | | |
|---|---|---|
| CN | 102186086 A | 9/2011 |
| JP | 2005348280 A | 12/2005 |

(Continued)

OTHER PUBLICATIONS

Kuroki et al, Adaptive Arithmetic Coding for Image Prediction Errors, 2004.*

(Continued)

*Primary Examiner* — Shan Elahi
(74) *Attorney, Agent, or Firm* — Young Basile Hanlon & MacFarlane P.C.

(57) ABSTRACT

Disclosed herein are implementations of systems, methods, and apparatuses for video encoding using variance. One aspect of the disclosed implementations includes a method for encoding a video stream that includes generating a first input variance based on pixel values of a first block of a first frame of the video stream, generating a first reconstruction variance based on pixel values of a reconstructed first block that is reconstructed from an encoding of the first block, comparing the first input variance and the first reconstruction variance to detect a visual artifact in the reconstructed first block, and encoding a second block of a second frame of the video stream using an encoding mode that is selected based on the detection of the visual artifact in the reconstructed first block by the comparison.

17 Claims, 6 Drawing Sheets

(56) References Cited

U.S. PATENT DOCUMENTS

| | | | |
|---|---|---|---|
| 8,644,374 B2* | 2/2014 | Chou et al. | 375/240 |
| 8,705,616 B2* | 4/2014 | He et al. | 375/240.02 |
| 8,718,140 B1 | 5/2014 | Cai et al. | |
| 8,737,824 B1 | 5/2014 | Bultje | |
| 2002/0181594 A1* | 12/2002 | Katsavounidis et al. | 375/240.24 |
| 2003/0012285 A1* | 1/2003 | Kim | 375/240.26 |
| 2003/0012287 A1* | 1/2003 | Katsavounidis et al. | 375/240.27 |
| 2003/0026343 A1* | 2/2003 | Kim et al. | 375/240.27 |
| 2003/0227977 A1* | 12/2003 | Henocq | 375/240.26 |
| 2005/0105614 A1* | 5/2005 | Katsavounidis et al. | 375/240.06 |
| 2005/0105625 A1* | 5/2005 | Kim et al. | 375/240.27 |
| 2005/0149831 A1* | 7/2005 | Katsavounidis et al. | 714/776 |
| 2005/0207497 A1* | 9/2005 | Rovati et al. | 375/240.16 |
| 2005/0254584 A1* | 11/2005 | Kim et al. | 375/240.27 |
| 2006/0215751 A1 | 9/2006 | Reichel et al. | |
| 2006/0245497 A1 | 11/2006 | Tourapis et al. | |
| 2007/0047648 A1 | 3/2007 | Tourapis et al. | |
| 2007/0047649 A1 | 3/2007 | Suzuki et al. | |
| 2007/0053427 A1* | 3/2007 | Henocq | 375/240 |
| 2007/0098067 A1 | 5/2007 | Kim et al. | |
| 2007/0140352 A1 | 6/2007 | Bhaskaran et al. | |
| 2007/0153897 A1 | 7/2007 | Yan | |
| 2007/0153899 A1 | 7/2007 | Koto et al. | |
| 2007/0206931 A1 | 9/2007 | Barbieri et al. | |
| 2008/0130754 A1 | 6/2008 | Winger | |
| 2008/0212678 A1 | 9/2008 | Booth et al. | |
| 2008/0260031 A1 | 10/2008 | Karczewicz | |
| 2008/0267292 A1 | 10/2008 | Ito et al. | |
| 2008/0285655 A1* | 11/2008 | Au et al. | 375/240.16 |
| 2009/0010556 A1 | 1/2009 | Uchibayashi et al. | |
| 2009/0110067 A1 | 4/2009 | Sekiguchi et al. | |
| 2009/0175338 A1 | 7/2009 | Segall | |
| 2009/0232207 A1 | 9/2009 | Chen | |
| 2009/0257492 A1 | 10/2009 | Andersson et al. | |
| 2010/0034260 A1 | 2/2010 | Shimizu et al. | |
| 2010/0150394 A1* | 6/2010 | Bloom et al. | 382/100 |
| 2010/0177826 A1* | 7/2010 | Bhaumik et al. | 375/240.16 |
| 2010/0195715 A1 | 8/2010 | Liu et al. | |
| 2010/0220790 A1 | 9/2010 | Jeon et al. | |
| 2010/0290530 A1 | 11/2010 | Huang et al. | |
| 2010/0303149 A1* | 12/2010 | Yasuda et al. | 375/240.03 |
| 2010/0322306 A1* | 12/2010 | Au et al. | 375/240.03 |
| 2011/0002386 A1 | 1/2011 | Zhang | |
| 2011/0051804 A1* | 3/2011 | Chou et al. | 375/240.03 |
| 2011/0182357 A1 | 7/2011 | Kim et al. | |
| 2011/0200109 A1 | 8/2011 | Joshi et al. | |
| 2011/0202160 A1 | 8/2011 | Moyne | |
| 2011/0222608 A1* | 9/2011 | Gao et al. | 375/240.24 |
| 2011/0228840 A1 | 9/2011 | Yamori | |
| 2011/0228858 A1* | 9/2011 | Budagavi et al. | 375/240.25 |
| 2011/0235930 A1 | 9/2011 | Kim et al. | |
| 2011/0243229 A1 | 10/2011 | Kim et al. | |
| 2011/0249734 A1 | 10/2011 | Segall et al. | |
| 2011/0261886 A1 | 10/2011 | Suzuki et al. | |
| 2011/0280304 A1 | 11/2011 | Jeon et al. | |
| 2012/0008683 A1 | 1/2012 | Karczewicz et al. | |
| 2012/0027094 A1 | 2/2012 | Sato et al. | |
| 2012/0201293 A1* | 8/2012 | Guo et al. | 375/240.02 |
| 2012/0250769 A1 | 10/2012 | Bross et al. | |
| 2012/0300837 A1 | 11/2012 | Wilkins et al. | |
| 2012/0307884 A1 | 12/2012 | MacInnis | |
| 2013/0016785 A1 | 1/2013 | Wang et al. | |
| 2013/0022102 A1* | 1/2013 | Casula | 375/240.02 |
| 2013/0022117 A1 | 1/2013 | Lou et al. | |
| 2013/0022119 A1 | 1/2013 | Chien et al. | |
| 2013/0027230 A1 | 1/2013 | Marpe et al. | |
| 2013/0259129 A1* | 10/2013 | Sato | 375/240.12 |
| 2014/0140408 A1 | 5/2014 | Lee Tammy et al. | |

FOREIGN PATENT DOCUMENTS

| | | |
|---|---|---|
| JP | 2007267414 | 10/2007 |
| KR | 20120135828 | 12/2012 |
| WO | WO2009051419 | 4/2009 |
| WO | WO2012126340 A1 | 9/2012 |

OTHER PUBLICATIONS

Sun et al, Motion-Compensated Vector Quantization With a Dynamic Codebook, 1990.*

Somasundaram et al, A Pattern-Based Residual Vector quantization Algorithm (PBRVQ) for Compressing Images, 2009.*

Wikipedia, the free encyclopedia, "Application-specific integrated circuit", http://en.wikipedia.org/wiki/Application-specific_integrated_circuit, 7 pp (Jun. 27, 2012).

Wikipedia, the free encyclopedia, "Register-transfer level", http://en.wikipedia.org/wiki/Register_transfer_level, 3 pp (Jun. 27, 2012).

The WebM Project, WebM Video Hardware RTLs, http://www.webmproject.org/hardware/, 3 pp, (Jun. 27, 2012).

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, an Open Source Video Codec for the Web". Dated Jul. 11, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

Cassidy, An analysis of VP8, a new video codec for the web, 148 pages. Nov. 2011.

(56) References Cited

OTHER PUBLICATIONS

Chen, et al., "SaVE: Sensor-assisted Motion Estimation for Efficient H.264/AVC Video Encoding." MM'09, Oct. 19-24, 2009, 10 pages, ACM, Beijing, China.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Guillotel, Philippe, et al.; "Comparison of motion vector coding techniques", SPIE vol. 2308, 1994, 11 pp.

H.264 video compression standard.: New possibilities within video surveillance. 2008, 10 pages, Axis Communications.

ISR and Written Opinion of the International Searching Authority for International Application No. PCT/US2012/021599, Mar. 28, 2012.

ISR and Written Opinion of the International Searching Authority for International Application No. PCT/US2012/021606, Mar. 28, 2012.

J. Jung, "Core Experiment 9: Motion Vector Coding," Document # JCTVC-0509, Guangzhou, China, Oct. 2010.

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Li B., et al., "Redundancy reduction in Cbf and merge coding", Document # JCTVC-C277, p. 6, Oct. 2, 2010.

Li S., et al.; "Direct Coding for Bipredicitive Slices in the H.264 Standard," IEEE Transactions on Circuits and Systems for Video Technology; vol. 15; No. 1; pp. 119-126; Jan. 1, 2005.

Liu, Bede, et al.; "A simple method to segment motion field for video coding", SPIE vol. 1818, Visual Communications and Image Processing 1992, 10 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Martin, Graham R., et al.; "Reduced Entropy Motion Compensation Using Variable Sized Blocks", SPIE vol. 3024, 1997, 10 pp.

Nicolas, H., et al.; "Region-based motion estimation using deterministic relaxation schemes for image sequence coding", IEEE 1992, 4 pp.

Nokia, Inc., Nokia Research Center, "MVC Decoder Description", Telecommunication Standardization Sector, Study Period 1997-2000, Geneva, Feb. 7, 2000, 99 pp.

Orchard, Michael T.; "Exploiting Scene Structure in Video Coding", IEEE 1991, 5 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Schiller, H., et al.; "Efficient Coding of Side Information in a Low Bitrate Hybrid Image Coder", Signal Processing 19 (1990) Elsevier Science Publishers B.V. 61-73, 13 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Seiler, et al., "Spatio-Temporal Prediction in Video Coding by Spatially Refined Motion Compensation," ICIP, 2008, pp. 2788-2791.

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

Steliaros, Michael K., et al.; "Locally-accurate motion estimation for object-based video coding", SPIE vol. 3309, 1997, 11 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Strobach, Peter; "Tree-Structured Scene Adaptive Coder", IEEE Transactions on Communications, vol. 38, No. 4, Apr. 1990, 10 pp.

Wiegand, Thomas, et al.; "Long-Term Memory Motion-Compensated Prediction", Publication Unknown, 15 pp., 1999.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Winken (Fraunhofer HHI) M. et al., "Video Coding Technology Proposal by Fraunhoffer HHI", 1. JCT-VC Meeting Apr. 15, 2010-Apr. 23, 2010; Dresden; (Joint Collaborative Team on Video Coding of IS/IEC JTC1/SC29/WG11 and ITU-T SG.16); URL:http://wftp3.itu.int/AV-ARCH/JCTVC-SITE/, No. 24 Apr. 2010, all pages.

Xiao, "Macroblock Level Hybrid Temporal-Spatial Prediction for H.264/AVC," Circuits and Systems (ISCAS), Proceedings of 2010 IEEE International Symposium, Paris, 4 pages.

Yusuke Itani et al., "Adaptive Direct Vector Derivation for Video Coding," Picture Coding Symposium, Dec. 8, 2010 C509, Guangzhou, China, Oct. 2010.

\* cited by examiner

VIDEO ENCODING USING VARIANCE

TECHNICAL FIELD

The present invention relates in general to video encoding.

BACKGROUND

Digital video streams can represent video using a sequence of frames (e.g., still images). Digital video can be used for various purposes including, for example, remote business meetings via video conferencing, high definition video entertainment, video advertisements, and sharing of user-generated videos. Digital video can be encoded using a computer or using hardware specifically designed for video encoding.

SUMMARY

Disclosed herein are implementations of systems, methods, and apparatuses for video encoding using variance.

An aspect of the disclosed implementations is a method for encoding a video stream. The method includes generating a first input variance based on pixel values of a first block of a first frame of the video stream, generating a first reconstruction variance based on pixel values of a reconstructed first block that is reconstructed from an encoding of the first block, comparing the first input variance and the first reconstruction variance to detect a visual artifact in the reconstructed first block, and encoding a second block of a second frame of the video stream using an encoding mode that is selected based on the detection of the visual artifact in the reconstructed first block by the comparison.

An aspect of the disclosed implementations is a computing device. The computing device includes a processing core configured to encode a video stream and a memory connected to the processing core by a bus, wherein the processing core is configured to encode blocks of the video stream using encoding modes, including at least one of an intra-prediction mode or an inter-prediction mode, and an encoding mode of a current block of the video stream is selected based on a comparison between an input variance and a reconstruction variance of a previous block of the video stream.

An aspect of the disclosed implementations is a non-transitory computer readable medium having stored thereon a register transfer level model of an encoder that when incorporated into an application-specific integrated circuit, causes the application-specific integrated circuit to perform steps including generating a first input variance based on pixel values of a first block of a first frame of a video stream, encoding the first block, reconstructing the encoded first block, generating a first reconstruction variance based on pixel values of the reconstructed first block, comparing the first input variance and the first reconstruction variance, and encoding a second block of a second frame of the video stream using an encoding mode that is selected based on a result of the comparison.

These and other implementations will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
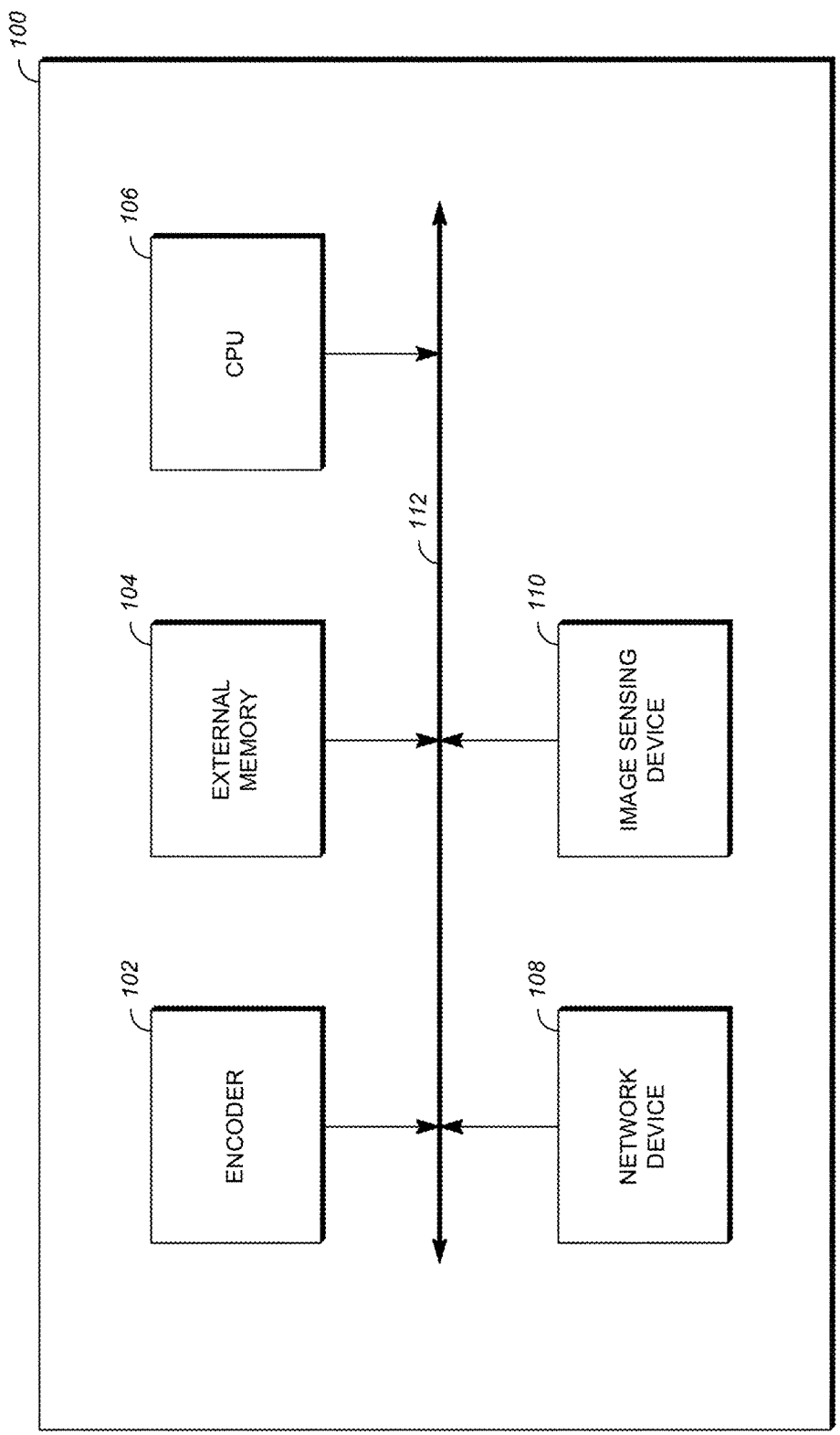
FIG. 1 is a schematic of an implementation of a computing device for video encoding in accordance with an implementation of this disclosure.

To permit transmission of digital video streams while limiting bandwidth consumption, video encoding and decoding implementations can incorporate various compression schemes. These compression schemes generally break the image up into blocks and use one or more techniques to limit the amount of information included in a resulting compressed video bitstream for transmission. The bitstream, once received, is then decoded to re-create the blocks and the source images from the limited information. Digital video can be encoded into video bitstreams using formats such as VPx, H.264, MPEG, MJPEG, and/or others.

Encoding a video stream, or a portion thereof, such as a frame or a block, can include using temporal and spatial similarities in the video stream to improve coding efficiency. For example, a current block of a video stream may be encoded based on a previously encoded block in the video stream by predicting motion and color information for the current block based on the previously encoded block and identifying a difference (residual) between the predicted values and the current block. Inter prediction can include using a previously encoded block from a previously encoded frame (reference frame). Intra prediction can include using a previously encoded block from the current frame. Intra prediction can be used for encoding, for example, a frame of video or individual images.

The type of prediction utilized for a block or frame can be identified by an encoding mode which can be encoded into the compressed video bitstream to enable decoding. For example, intra prediction can include predicting values for a current block based on values of spatially proximate previously encoded blocks in the current frame which can be identified using one or more intra prediction modes, such as horizontal prediction (H_PRED), vertical prediction (V_PRED), DC prediction (DC_PRED), or TrueMotion prediction (TM_PRED).

Encoding a video stream can include selection of an encoding mode to be utilized to encode a block of the video stream. The encoding mode can be selected by determining a score for various available encoding modes. For example, the score can be an estimation of the resulting quality and/or compressed size of an encoded block using a particular encoding mode. The scores can be compared to select the encoding mode for the block. In some implementations, the estimation of the scores can be suboptimal, for example, due to implementation constraints such as limited processor speed and/or also due to a low encoding bitrate (e.g. high quantization) selected for encoding. When the estimation is suboptimal, visual artifacts can be included in the encoded block due to suboptimal selection of an inter prediction mode (e.g., using a reference block near a boundary of a moving object in a frame). For example, a reference block can be selected that includes a portion of a moving object that is not included in the block to be encoded and the residual values representative of the differences associated with the moving object with respect to the block to be encoded can be omitted from the encoded bitstream due to a high quantization value.

Video encoding using variance can include generating a first input variance for a first block of a first frame, generating a first reconstruction variance for a reconstruction of an encoding of the first block of the first frame, generating a second input variance for a second block of a second frame following the first frame, where the first block and second block are at spatially corresponding locations in the frames, and using one or more comparisons of the generated variances in the selection of the encoding mode for the second block. In an implementation, comparison of the variances can be utilized to detect visual artifacts in the reconstructed first block. If visual artifacts are detected, selection of the encoding mode can be biased towards selection of an intra prediction encoding mode for the second block in order to reduce the likelihood of the visual artifacts being propagated to the second block by the selection of an inter prediction encoding mode.

FIG. 1 is a schematic of an implementation of a computing device 100 for video encoding in accordance with an implementation of the disclosure. Computing device 100 can be any type of computing device such as, for example, a computer, mobile device, consumer appliance, or embedded device. Computing device 100 can include an encoder 102, external memory 104, central processing unit (CPU) 106, network device 108, image sensing device 110, bus 112, or a combination thereof.

Encoder 102 can be implemented using an application-specific integrated circuit (ASIC) or a field-programmable gate array (FPGA). Encoder 102 can be configured to encode a video stream using encoding techniques such as those described with respect to FIGS. 3 and 5. External memory 104 can be connected to encoder 102 using bus 112. External memory 104 can include configuration settings and parameters to be used by encoder 102. Encoder 102 can further utilize external memory 104 for storage of input data for encoding (e.g., a video stream), for storage of values utilized during encoding, and/or for storage of output data from encoding (e.g., a compressed bitstream).

One or more functions incorporated into encoder 102 can be implemented using a register transfer level (RTL) design. The RTL design can be in the form of a hardware description language (HDL) such as Verilog HDL. The RTL design can be incorporated into an ASIC. Incorporation of the RTL design can include using techniques such as logic synthesis to produce a gate-level netlist which can then be used to fabricate the ASIC.

CPU 106 can be a general purpose processor capable of executing instructions stored in external memory 104 accessed via bus 112. CPU 106 can be configured to control the operation of encoder 102. In an implementation, external memory 104 can include a hardware driver that enables CPU 106 to control the operation of encoder 102. In an implementation, the operation of encoder 102 can be further controlled by a software program stored in external memory 104 using an application programming interface (API) of the hardware driver.

Network device 108 can enable the computing device 100 to send and/or receive data from a network (not shown). In an implementation, network device 108 can be utilized to receive a video stream for encoding, to transmit a compressed bitstream encoded by encoder 102, or a combination thereof. The network can, for example, be the Internet. The network can also be a local area network (LAN), wide area network (WAN), virtual private network (VPN), or any other means of transferring data to or from computing device 100.

Computing device 100 can also include or be in communication with an image-sensing device 110, for example a camera, or any other image-sensing device 110 now existing or hereafter developed that can sense images, such as an image of a device user operating computing device 110. The image-sensing device 110 can be positioned such that it is directed toward a device user that is operating the computing device 100. The image-sensing device 110 can be configured to receive images, for example, of the face of a device user while the device user is operating the computing device 100.

Although FIG. 1 depicts components such as CPU 106 and external memory 104 of the computing device 100 as being integrated into a single unit, other configurations can be utilized. The operations of the CPU 106 can be distributed across multiple devices or machines. External memory 104 can be distributed across multiple devices or machines such as network-based memory or memory in multiple machines performing the operations of the computing device 100. Although depicted here as a single bus, the bus 112 of the computing device 100 can be composed of multiple buses. Further, the external memory 104 can be directly coupled to the other components of the computing device 100 or can be accessed via a network and can comprise a single integrated unit such as a memory card or multiple units such as multiple memory cards. In an implementation, multiple components or portions of components of computing device 100 can be incorporated into a system-on-a-chip (SoC). For example, bus 112 can include a standard bus interface such as an Advanced Microcontroller Bus Architecture (AMBA) Advanced eXtensible Interface (AXI) which can be used as an on-chip bus in SoC designs. The computing device 100 can thus be implemented in a wide variety of configurations.

Figure 2:
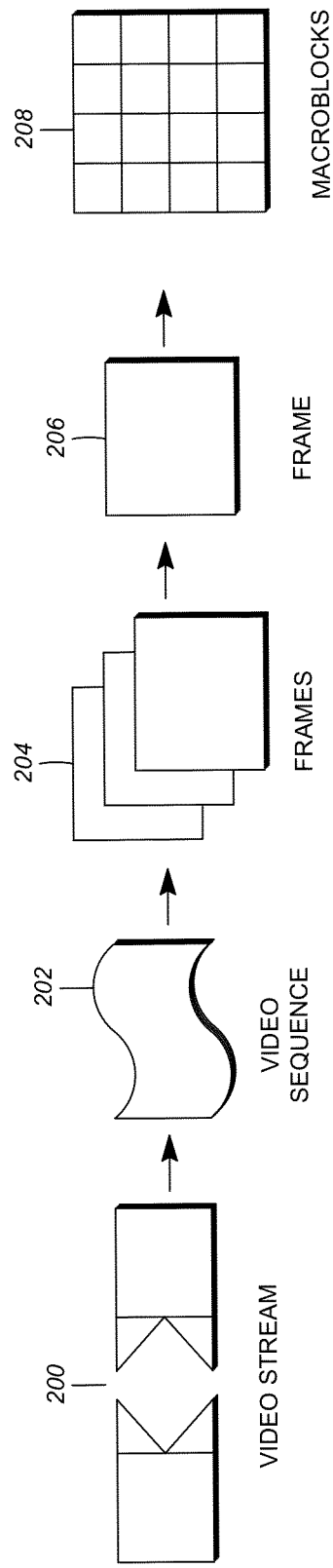
FIG. 2 is a diagram of a typical video stream to be encoded and/or decoded.

FIG. 2 is a diagram of a typical video stream 200 to be encoded and/or decoded. Video coding formats, such as VP8 or H.264, provide a defined hierarchy of layers for a video stream. The video stream 200 includes a video sequence 202. At the next level, the video sequence 202 includes a number of adjacent frames 204. While three frames are depicted in adjacent frames 204, the video sequence 202 can include any number of adjacent frames. The adjacent frames 204 can then be further subdivided into a single frame 206. At the next level, the single frame 206 can be divided into a series of blocks 208, which can contain data corresponding to, for example, a 16×16 pixel group of displayed pixels in the frame 206. Each block can contain luminance and chrominance data for the corresponding pixels. The blocks 208 can also be of any other suitable size such as 16×8 pixel groups or 8×16 pixel groups.

Figure 3:
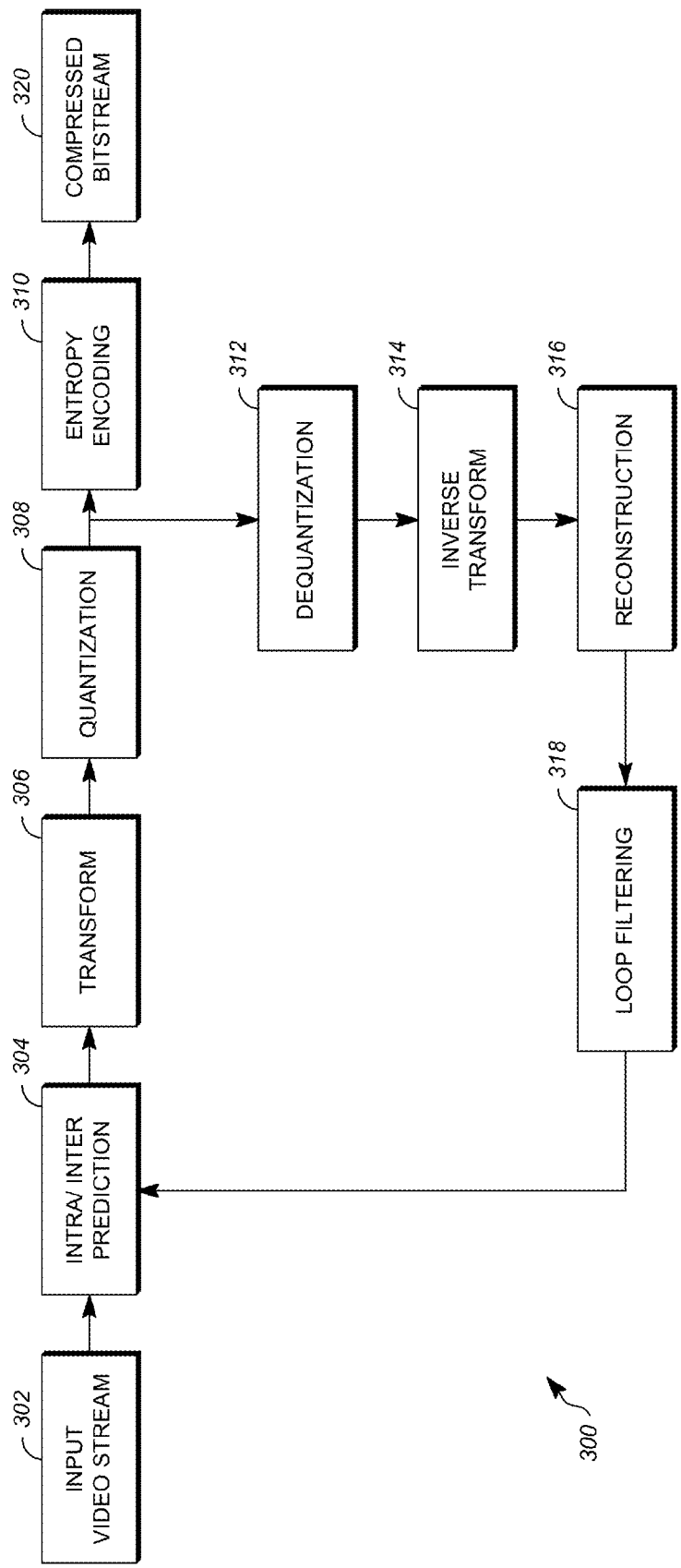
FIG. 3 is a block diagram of an encoding technique in accordance with an implementation of this disclosure.

FIG. 3 is a block diagram of an encoding technique 300 in accordance with an implementation of this disclosure. Encoding technique 300 can be implemented, as described above, in encoder 102 of computing device 100, for example. Encoder 102 can include circuitry that enables encoder 102 to encode video data in the manner described in FIG. 3. In an implementation, encoder 102 can be controlled by CPU 106 by use of a hardware driver and/or API. Encoder 102 can also be implemented partially or fully as a software program which can be stored in external memory 104.

Encoding technique 300 encodes an input video stream 302 (e.g., video stream 200). Encoding technique 300 has the following stages to perform the various functions in a forward path (shown by the solid connection lines) to produce an encoded or a compressed bitstream 320: an intra/inter prediction stage 304, a transform stage 306, a quantization stage 308, and an entropy encoding stage 310. Encoding technique 300 also includes a reconstruction path (shown by the dotted connection lines) to reconstruct a frame for encoding of further blocks. Encoding technique 300 can include the following stages to perform the various functions in the reconstruction path: a dequantization stage 312, an inverse transform stage 314, a reconstruction stage 316, and a loop filtering stage 318. Other variations of encoding technique 300 can be used to encode the input video stream 302.

When the input video stream 302 is presented for encoding, a frame (e.g., frame 208) within the input video stream 302 is processed in units of blocks. At the intra/inter prediction stage 304, blocks can be encoded using intra-frame prediction (within a single frame) or inter-frame prediction (from frame to frame). In either case, a prediction block can be formed. In the case of intra-prediction, a prediction block can be formed from prediction samples in the current frame that have been previously encoded and reconstructed. In the case of inter-prediction, a prediction block can be formed from prediction samples in one or more previously constructed reference frames.

Next, still referring to FIG. 3, the prediction block can be subtracted from the current block at the intra/inter prediction stage 304 to produce a residual block (residual). The transform stage 306 transforms the residual into transform coefficients in, for example, the frequency domain. Examples of block-based transforms include the Karhunen-Loève Transform (KLT), the Discrete Cosine Transform ("DCT"), and the Singular Value Decomposition Transform ("SVD"). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

The quantization stage 308 converts the transform coefficients into discrete quantum values, which are referred to as quantized transform coefficients or quantization levels. The quantized transform coefficients are then entropy encoded by the entropy encoding stage 310. Entropy encoding can include the use of various techniques, such as formatting compressed bitstream 320 using run-length encoding (RLE) and zero-run coding. The entropy-encoded coefficients, together with the information used to decode the block, such as the type of prediction used, motion vectors, and quantizer value, are then output to the compressed bitstream 320.

The reconstruction path in FIG. 3 (shown by the dotted connection lines) can be used to ensure that both the encoding technique 300 and decoding technique 400 (described below) use the same reference frames to decode the compressed bitstream 320. The reconstruction path performs functions that are similar to functions that take place during the decoding process that are discussed in more detail below, including dequantizing the quantized transform coefficients at the dequantization stage 312 and inverse transforming the dequantized transform coefficients at the inverse transform stage 314 to produce a derivative residual block (derivative residual). At the reconstruction stage 316, the prediction block that was predicted at the intra/inter prediction stage 304 can be added to the derivative residual to create a reconstructed block. The loop filtering stage 318 can be applied to the reconstructed block to reduce distortion such as blocking artifacts.

Other variations of encoding technique 300 can be used to encode the compressed bitstream 320. For example, a non-transform based encoder can quantize the residual signal directly without the transform stage 306. In another implementation, an encoder can have the quantization stage 308 and the dequantization stage 312 combined into a single stage.

Figure 4:
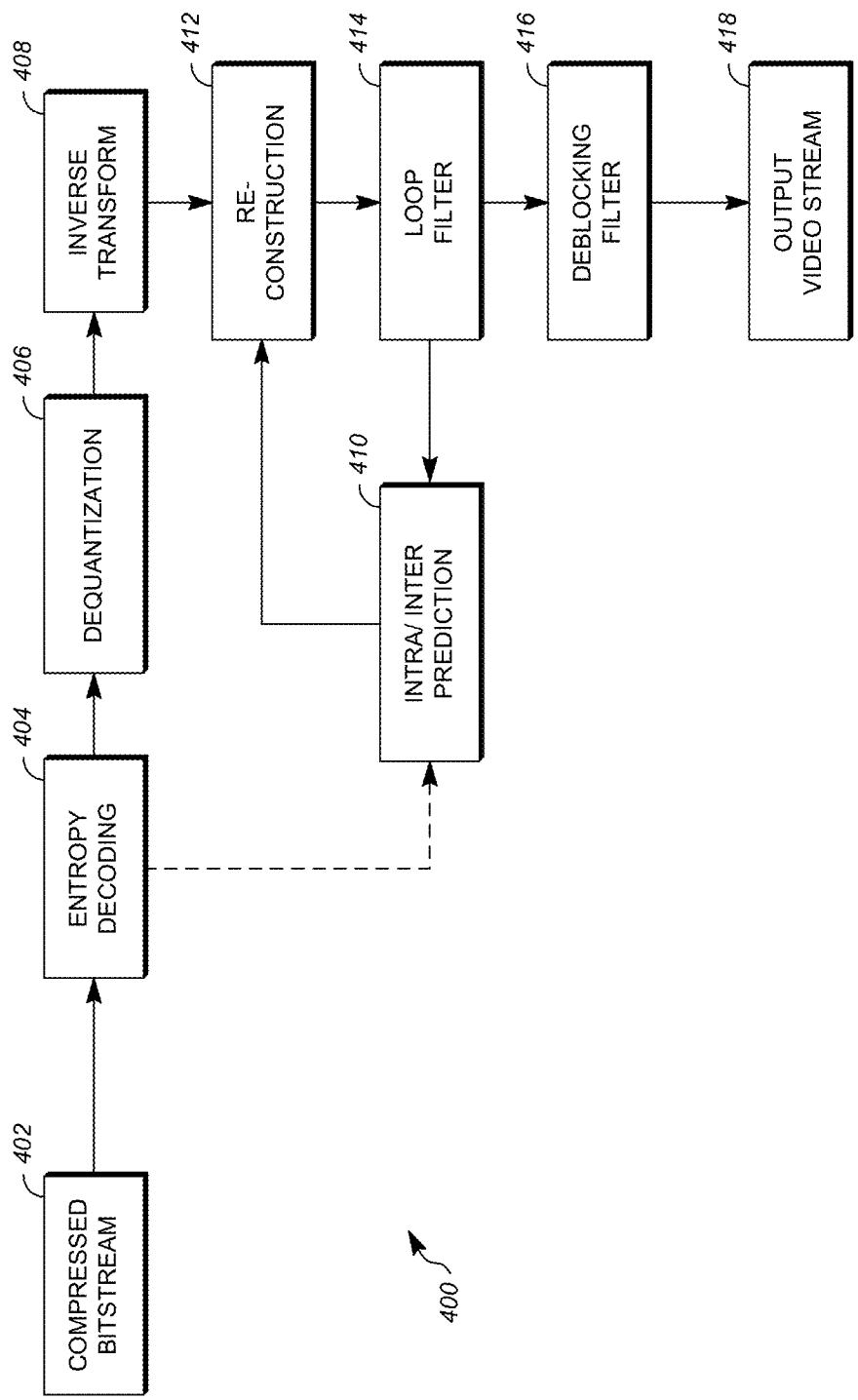
FIG. 4 is a block diagram of a decoding technique in accordance with an implementation of this disclosure.

FIG. 4 is a block diagram of a decoding technique 400 in accordance with an implementation of this disclosure. Decoding technique 400 can be implemented in computing device 100, for example, by providing a computer software program stored in external memory 104. The computer software program can include machine instructions that, when executed by CPU 106, cause computing device 100 to decode video data in the manner described in FIG. 4. Decoding technique 400 can also be implemented as hardware (e.g., an ASIC or FPGA) included in computing device 100.

Decoding technique 400, similar to the reconstruction path of encoding technique 300 discussed above, includes in one example the following stages to perform various functions to produce an output video stream 418 from a compressed bitstream 402 (e.g., compressed bitstream 320): an entropy decoding stage 404, a dequantization stage 406, an inverse transform stage 408, an intra/inter prediction stage 410, a reconstruction stage 412, a loop filtering stage 414 and a deblocking filtering stage 416. Other variations of decoding technique 400 can be used to decode the compressed bitstream 402.

When the compressed bitstream 402 is presented for decoding, the data elements within the compressed bitstream 402 can be decoded by the entropy decoding stage 404 (using, for example, Context Adaptive Binary Arithmetic Decoding) to produce a set of quantized transform coefficients. The dequantization stage 406 dequantizes the quantized transform coefficients, and the inverse transform stage 408 inverse transforms the dequantized transform coefficients to produce a derivative residual. Using header information decoded from the compressed bitstream 402, decoding technique 400 can use the intra/inter prediction stage 410 to create a prediction block. At the reconstruction stage 412, the prediction block can be added to the derivative residual to create a reconstructed block. The loop filtering stage 414 can be applied to the reconstructed block to reduce blocking artifacts. The deblocking filtering stage 416 can be applied to the reconstructed block to reduce blocking distortion, and the result is output as the output video stream 418.

Other variations of decoding technique 400 can be used to decode the compressed bitstream 402. For example, decoding technique 400 can produce the output video stream 418 without the deblocking filtering stage 416.

Figure 5:
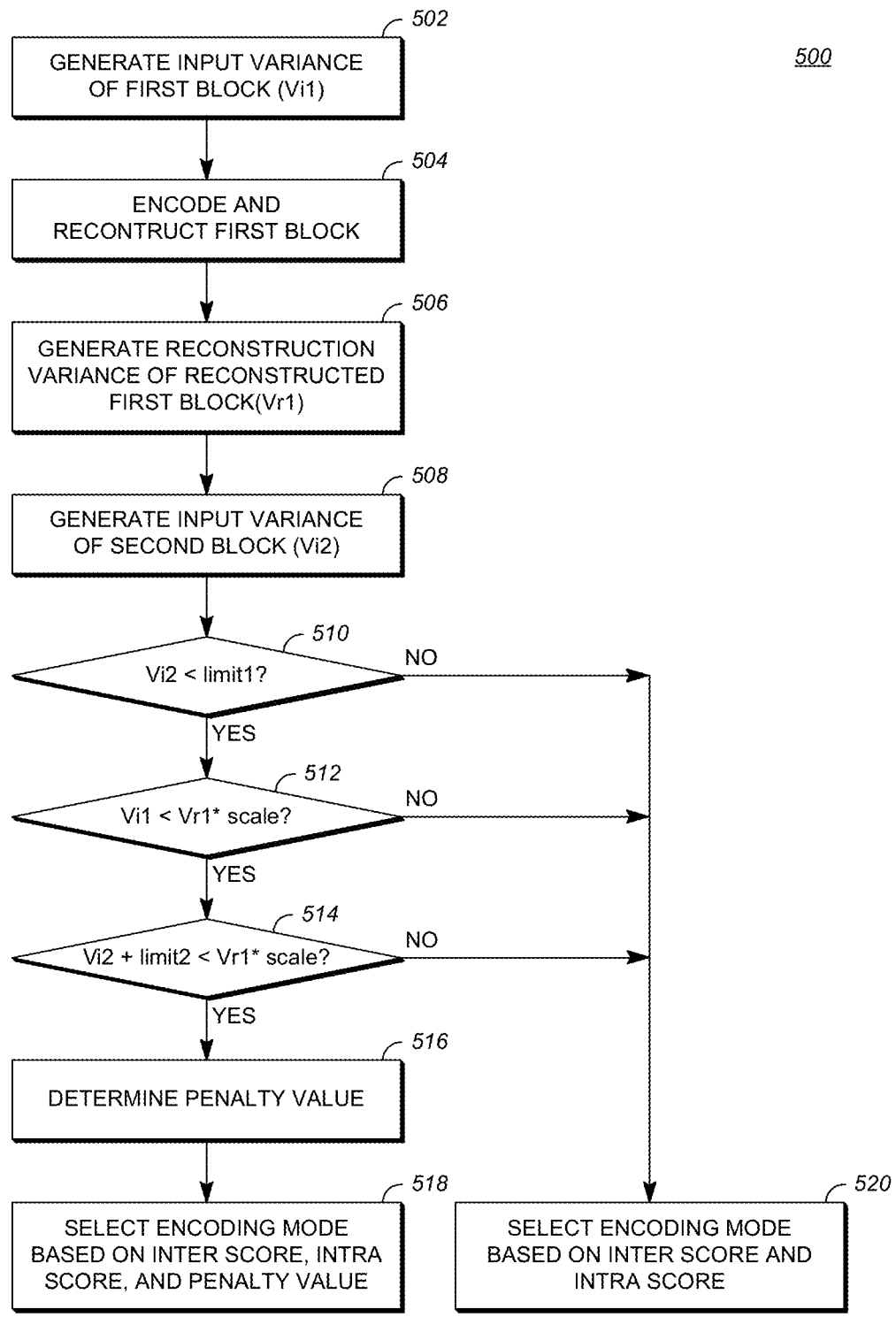
FIG. 5 is a flowchart of a technique for video encoding using variance in accordance with an implementation of this disclosure.

FIG. 5 is a flowchart of a technique 500 for video encoding using variance in accordance with an implementation of this disclosure. Technique 500 can be included, for example, in inter/intra prediction stage 304 of encoding technique 300. Technique 500 can be incorporated, for example, in encoder 102 of computing device 100. At stage 502, a first input variance ($V_1^i$) of a first block of a first frame of a video stream is generated based on pixel values of the first block. The variance of a set of values X (Var(X)) can be a statistical variance generated based on the following equations or an estimation thereof:

$$\text{Var}(X) = E[(X-\mu)^2] = E[X^2] - (E[X])^2; \quad [\text{Equation 1}]$$

wherein
$\mu$ is the mean of X and $\mu = E[X]$.

The first input variance can be stored, for example, in external memory 104. At stage 504, the first block can be encoded and reconstructed to generate a reconstructed first block by using, for example, the forward path and reconstruction path of encoding technique 300. At stage 506, a first reconstruction variance ($V_1^r$) of a first block of a first frame of a video stream is generated based on pixel values of the reconstructed first block. At stage 508, a second input variance ($V_2^i$) of a second block of a second frame of a video stream is generated based on pixel values of the second block.

At stage 510, a comparison is made to determine if $V_2^i$ is less than limit1, a pre-determined factor. The value of limit1 can be stored in external storage 104. If $V_2^i$ is less than limit1, control passes to stage 512, where a comparison is made to determine if $V_1^i$ is less than $V_1^r$ multiplied by scale, a pre-determined factor. If $V_1^i$ is less than $V_1^r$ multiplied by scale, control passes to 514, wherein a comparison is made to determine if $V_2^i$ plus limit2, a pre-determined factor is less than $V_1^r$ multiplied by scale. If $V_2^i$ plus limit2, a pre-determined factor is less than $V_1^r$ multiplied by scale, control passes to stage 516, where a penalty value is determined. For example, the penalty value can be set to a pre-determined value or can be set based on some or all of the values available to technique 500, such as $V_1^i$ and $V_1^r$.

At stage 518, an encoding mode for the second block is determined based on an intra score, inter score, and the penalty value. For example, an intra score can be determined for an intra prediction mode and an inter score can be determined for an inter prediction mode. The scores can estimate the resulting quality and/or compressed size of an encoded block using either the intra prediction mode or the inter prediction mode. For example a sum of absolute differences (SAD) can be calculated for prediction samples to be used in each mode to determine the score for each mode. Other techniques can also be utilized to determine the scores.

The penalty value can be added to either of the scores, and the resulting scores can be compared to select the encoding mode. For example, the penalty value can bias the selection towards the intra prediction mode based on the detection of a visual artifact by the comparisons of stages 510, 512, and 514.

If any of the comparisons of stages 510, 512, 514 do not meet the specified criteria, control instead passes to stage 520, where an encoding mode for the second block is selected based on an intra score and an inter score. Operation of stage 520 can be the same as stage 518 with the exception that a penalty value is not utilized. For example, the comparisons can indicate that a visual artifact has not been detected and that no bias is to be applied in the selection of the encoding mode.

Once the encoding mode is determined for the second block, the second block can be encoded using the selected encoding mode (not shown). The stages of technique 500 as described are exemplary and other implementations are available. For example, stages of technique 500 can be added, omitted, combined, split, or otherwise modified. For example, stages 510 and 514 can be omitted from technique 500. As another example, the comparison used in technique 512 can be altered, such as by removing or changing the use of the scale factor. In implementations, technique 500 can further include determining whether the first block was encoded using an intra prediction mode and not biasing the selection of the encoding mode if the first block was encoded using an intra prediction mode.

Technique 500 can further be incorporated into a process for encoding blocks in a video stream, where the blocks include multiple components, such as luma and chroma values. The following pseudo-code illustrates an implementation of using technique 500 for encoding a block of a video stream having multiple components:

TABLE 1

```
struct boost_def {
    i32 var_input_n[3];      /* Input variance of current frame mb (Luma, Cb and Cr) */
    i32 var_input_n-1[3];    /* Input variance of previous frame mb */
    i32 var_recon_n[3]       /* Reconstructed variance of current frame mb */
    i32 var_recon_n-1[3]     /* Reconstructed variance of previous frame mb */
    type mb_type_n-1;        /* Macroblock coding type of previous frame */
}
struct boost_def boost[MB_CNT]; /* initialize boost */
* * *
artifact = false             /* No artifact detected yet */
for (i = 0; i < 3; i++) {    /* Luma, cb, cr */
    if (boost[mbNum].var_input_n[i] < limit1) {
        if (boost[mbNum].var_input_n-1[i] < boost[mbNum].var_recon_n-1[i]*scale) {
            if (boost[mbNum].var_input_n[i] + limit2 < boost[mbNum].var_recon_n-1[i]*scale) {
                artifact = true;    /* Artifact is detected */
            }
        }
    }
}
if (mb->boost[mbNum].mb_type_n-1 == INTRA) {
    artifact = false;
}
```

The above pseudo-code includes a memory structure boost used to store arrays of variance values in memory for $V_1^i$, $V_1^r$, and $V_2^r$ associated with each component. Comparisons can be made for each component of the block using the values stored in memory (e.g., external memory 104). If comparisons of the variance values associated with any component of the block indicates that a visual artifact is present in the previous block (e.g., first block), then the visual artifact is attributed to the entire block. If the previous block is encoded using an intra mode prediction, the comparisons can be overridden such that no visual artifact is deemed detected.

The current block being processed in the above pseudo-code is identified by mbNum. As such, the above pseudo-code can process multiple blocks of the frame by changing mbNum to refer to other blocks in the frame. The boost variable can be an array that includes values associated with each block in a frame.

Figure 6:
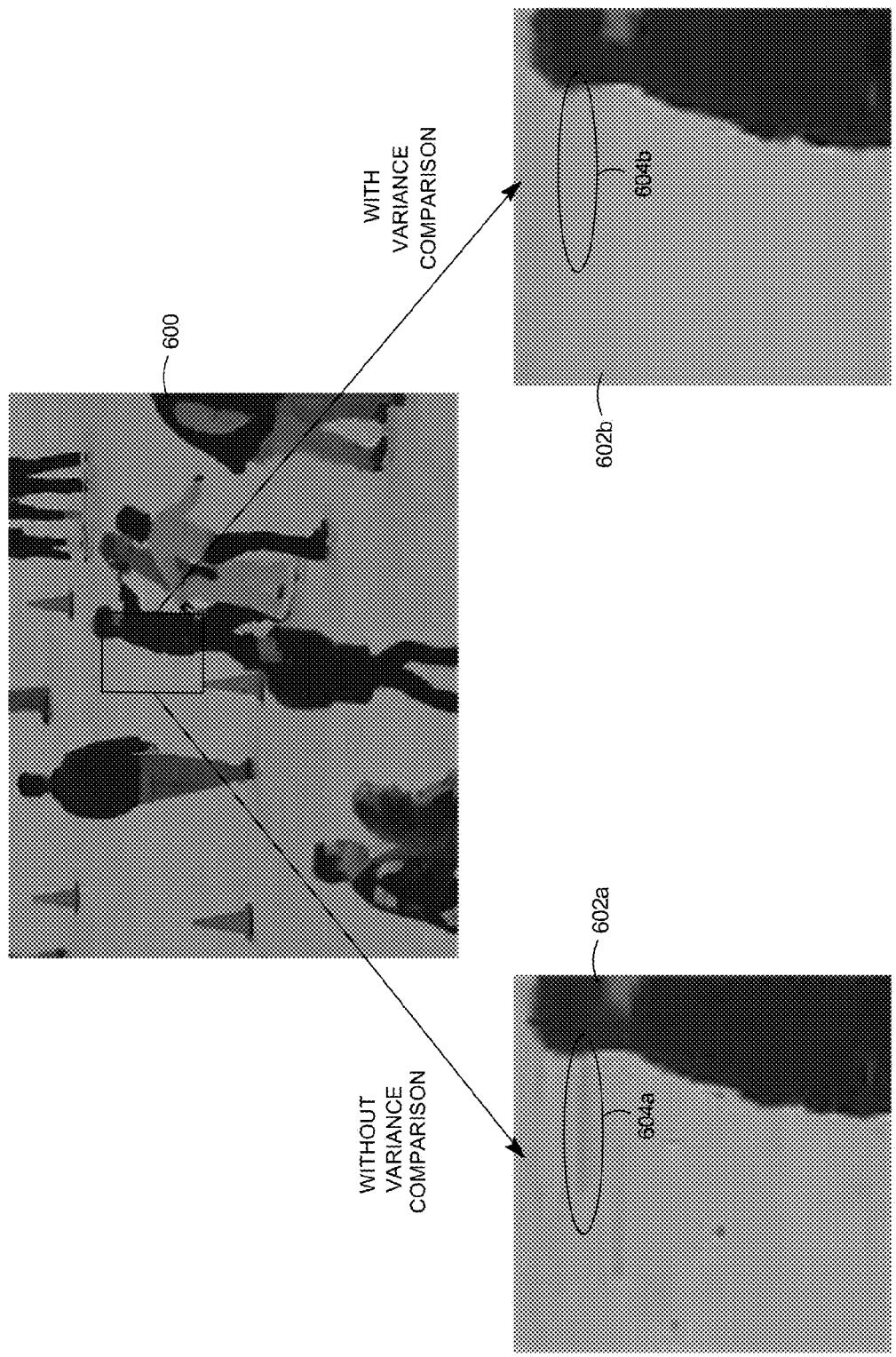
FIG. 6 is a depiction of an exemplary image encoded using variance and without using variance in accordance with an implementation of this disclosure.

FIG. 6 is a depiction of an exemplary image 600 encoded using variance and without using variance in accordance with an implementation of this disclosure. Image 600 can be, for example, a frame of a video stream. An encoding of portion of image 600 is shown as portions 602a and 602b. Portion 602a is an example of encoding without variance, and portion 602b is an example of encoding with variance (e.g., by use of technique 500). Portion 602a includes visual artifacts such as the artifact shown in area 604a. The visual artifacts can be caused by the use of an inter prediction mode for encoding using a reference block that is near a boundary of a moving object. The visual artifacts can be avoided by the use of encoding with variance, as is shown by the absence of a visual artifact in area 604b of portion 602b.

The use of the adjectives "first," "second," "third," etcetera herein is not intended to infer any particular meaning regarding the ordering or positioning of elements unless specifically indicated. For example, a first frame and a second frame of a video stream can refer to any two frames of the video stream and does not necessarily indicate that the first frame and the second frame are the first two frames of the video stream or that the first frame is located before the second frame.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The processors described herein can be any type of device, or multiple devices, capable of manipulating or processing information now-existing or hereafter developed, including, for example, optical processors, quantum and/or molecular processors, general purpose processors, special purpose processors, intellectual property (IP) cores, ASICS, programmable logic arrays, programmable logic controllers, microcode, firmware, microcontrollers, microprocessors, digital signal processors, memory, or any combination of the foregoing. In the claims, the terms "processor," "core," and "controller" should be understood as including any of the foregoing, either singly or in combination. Although a processor of those described herein may be illustrated for simplicity as a single unit, it can include multiple processors or cores.

In accordance with an implementation of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein such as a method for performing a coding operation on video data using a computing device containing a plurality of processors in accordance with an implementation of the invention.

A computer-readable medium may be a non-transitory computer-readable media including all forms and types of memory and all computer-readable media except for a transitory, propagating signal. In an implementation, the non-volatile memory or computer-readable medium may be external memory.

Although specific hardware and data configurations have been described herein, note that any number of other configurations may be provided in accordance with implementations of the invention. Thus, while there have been shown, described, and pointed out fundamental novel features of the invention as applied to several implementations, it will be understood that various omissions, substitutions, and changes in the form and details of the illustrated implementations, and in their operation, may be made by those skilled in the art without departing from the spirit and scope of the invention. Substitutions of elements from one implementation to another are also fully intended and contemplated. The invention is defined solely with regard to the claims appended hereto, and equivalents of the recitations therein.

The invention claimed is:

1. A method for encoding a video stream comprising:
generating a first input variance based on pixel values of a first block of a first frame of the video stream;
generating a first reconstruction variance based on pixel values of a reconstructed first block that is reconstructed from an encoding of the first block;
comparing the first input variance and the first reconstruction variance to detect a visual artifact in the reconstructed first block; and
encoding a second block of a second frame of the video stream using an encoding mode that is selected based on the detection of the visual artifact in the reconstructed first block by the comparison, wherein the encoding mode is one of an intra-prediction mode or an inter-prediction mode, and wherein encoding the second block using the comparison includes:
determining a first score associated with encoding the second block using the inter-prediction mode;
determining a second score associated with encoding the second block using the intra-prediction mode;
determining a penalty value based on the comparison;
selecting one of the intra-prediction mode or the inter-prediction mode based on the first score, the second score, and the penalty value; and
encoding the second block using the selected mode.

2. The method of claim 1, wherein the selection of the encoding mode is biased towards selection of the intra-prediction mode if the comparison of the first input variance and the first reconstruction variance indicates that one or more artifacts are detected in the reconstructed first block.

3. The method of claim 1, wherein the first score is determined based on a sum of absolute differences between the second block and prediction samples selected using the inter-prediction mode and the second score is determined based on a sum of absolute differences between the second block and prediction samples selected using the intra-prediction mode.

4. The method of claim 1, wherein comparing the first input variance and the first reconstruction variance includes determining a condition that the first input variance is less than the first reconstruction variance scaled by a first pre-determined factor and encoding the second block includes biasing the selection of the encoding mode towards selection of the intra-prediction mode using a second pre-determined factor after the condition is determined.

5. The method of claim 4, wherein the condition is a first condition and the method further comprises:
generating a second input variance based on pixel values of the second block; and
comparing the second input variance and the first reconstruction variance including determining a second condition that the second input variance biased by a third pre-determined factor is less than the first reconstruction variance scaled by the first pre-determined factor,
wherein biasing the selection of the encoding mode is performed after both the first condition and the second condition are determined.

6. The method of claim 4, wherein the condition is a first condition and the method further comprises:
generating a second input variance based on pixel values of the second block; and
comparing the second input variance and a third pre-determined factor including determining a second condition that the second input variance is less than the third pre-determined factor,
wherein biasing the selection of the encoding mode is performed after both the first condition and the second condition are determined.

7. The method of claim 4, wherein biasing the selection of the encoding mode is conditioned on a determination that the first block was encoded using an inter prediction mode.

8. The method of claim 1, wherein the pixel values of the first block and the reconstructed first block respectively include a plurality of luminance values and a plurality of chrominance values, generating a first input variance includes generating an input variance for the luminance values of the first block and an input variance for the chrominance values of the first block, generating the first reconstruction variance includes generating a reconstruction variance for the luminance values of the reconstructed first block and a reconstruction variance for the chrominance values of the reconstructed first block, and the comparison includes separately comparing the variances of the luminance values and the variances of the chrominance values.

9. The method of claim 1, wherein the first block and the second block are located at spatially corresponding locations in the first frame and the second frame.

10. A computing device comprising:
a processing core configured to encode a video stream; and
a memory connected to the processing core by a bus,
wherein the processing core is configured to encode blocks of the video stream using encoding modes, including at least one of an intra-prediction mode or an inter-prediction mode, and an encoding mode of a current block of the video stream is selected based on a comparison between an input variance and a reconstruction variance of a previous block of the video stream, wherein the comparison includes a first determination that the input variance of the previous block is less than the reconstruction variance of the previous block multiplied by a first pre-determined factor and selecting the encoding mode of the current block includes a bias towards selection of the intra-prediction mode based on the first determination, and wherein the processing core is configured to encode the current block by determining a first score associated with encoding the current block using the inter-prediction mode, determining a second score associated with encoding the current block using the intra-prediction mode, determining a penalty value to generate the selection bias, and determining the encoding mode based on the first score, the second score, and the penalty value.

11. The computing device of claim 10, wherein the processing core is an application-specific integrated circuit or a field-programmable gate array device.

12. The computing device of claim 11, wherein the processing core is configured using a register transfer level design that describes an encoder.

13. The computing device of claim 10, wherein the comparison further includes a second determination that an input variance of the current block plus a second pre-determined factor is less than the reconstruction variance of the previous block multiplied by the first pre-determined factor and selecting the encoding mode of the current block includes a bias towards selection of the intra-prediction mode based on the second determination.

14. The computing device of claim 13, wherein the comparison further includes a third determination that the input variance of the current block is less than a third pre-determined factor and selecting the encoding mode of the current block includes a bias towards selection of the intra-prediction mode based on the third determination.

15. The computing device of claim 10, wherein the current block and the previous block are located at spatially corresponding locations in a current frame and a previous frame.

16. A non-transitory computer readable medium having stored thereon a register transfer level model of an encoder that when incorporated into an application-specific integrated circuit, causes the application-specific integrated circuit to perform steps comprising:
generating a first input variance based on pixel values of a first block of a first frame of a video stream;
encoding the first block;
reconstructing the encoded first block;
generating a first reconstruction variance based on pixel values of the reconstructed first block;
comparing the first input variance and the first reconstruction variance; and
encoding a second block of a second frame of the video stream using an encoding mode that is selected based on a result of the comparison, wherein encoding the second block using the comparison includes:
determining a first score associated with encoding the second block using the inter-prediction mode;
determining a second score associated with encoding the second block using the intra-prediction mode;
determining a penalty value based on the comparison;
selecting one of the intra-prediction mode or the inter-prediction mode based on the first score, the second score, and the penalty value; and
encoding the second block using the selected mode.

17. The computer readable medium of claim 16, wherein the encoding mode is one of an intra-prediction mode or an inter-prediction mode and the selection of the encoding mode is biased towards selection of the intra-prediction mode if the comparison of the first input variance and the first reconstruction variance indicates that artifacts are present in the reconstructed first block.

* * * * *